US010026095B2

(12) United States Patent
Li

(10) Patent No.: US 10,026,095 B2
(45) Date of Patent: Jul. 17, 2018

(54) SYSTEMS AND METHODS FOR OBTAINING AND UTILIZING USER REACTION AND FEEDBACK

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 601 days.

(21) Appl. No.: 14/462,532

(22) Filed: Aug. 18, 2014

(65) Prior Publication Data

US 2016/0048866 A1    Feb. 18, 2016

Related U.S. Application Data

(60) Provisional application No. 61/875,702, filed on Sep. 10, 2013.

(51) Int. Cl.
*G09G 5/00* (2006.01)
*G06Q 30/02* (2012.01)
*G06K 9/00* (2006.01)

(52) U.S. Cl.
CPC ..... *G06Q 30/0242* (2013.01); *G06K 9/00604* (2013.01)

(58) Field of Classification Search
None
See application file for complete search history.

(56) References Cited

U.S. PATENT DOCUMENTS

| | | | | |
|---|---|---|---|---|
| 8,531,354 B2* | 9/2013 | Woodard | ................ | G09G 5/00 345/7 |
| 8,643,680 B2* | 2/2014 | Baldwin | ................ | G06F 3/013 345/156 |
| 9,081,436 B1* | 7/2015 | Berme | ................ | G06F 3/0414 |
| 9,513,699 B2* | 12/2016 | Jung | ................ | G06F 3/011 |
| 9,526,443 B1* | 12/2016 | Berme | ................ | A61B 5/1123 |
| 2006/0256133 A1* | 11/2006 | Rosenberg | ............ | G06F 3/013 345/619 |
| 2014/0125585 A1* | 5/2014 | Song | ................ | G06F 3/013 345/156 |
| 2014/0195328 A1* | 7/2014 | Ferens | ............ | G06Q 30/0271 705/14.41 |
| 2014/0245335 A1* | 8/2014 | Holden | ............ | H04N 21/44218 725/12 |
| 2015/0277556 A1* | 10/2015 | Hayashida | ............ | G06F 3/013 382/103 |
| 2017/0206562 A1* | 7/2017 | Mowry | ............ | G06Q 30/0269 |

* cited by examiner

*Primary Examiner* — Sunit Pandya

(57) ABSTRACT

Systems and methods for getting and using reaction and feedback on contents presented on device. In an aspect, viewing time of a user is measured by eye-tracking method, and used to conduct analysis, change contents, charge fees, or award the user. In another aspect, other methods are used to detect user reaction and feedback, perform feedback analysis, respond to user request, or improve user experience. Contents include advertisements or other sponsored programs.

20 Claims, 6 Drawing Sheets

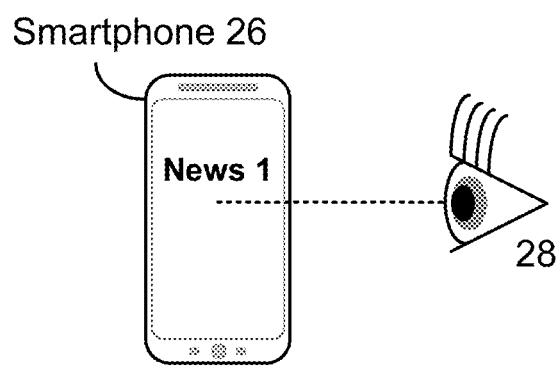
FIG. 2-A
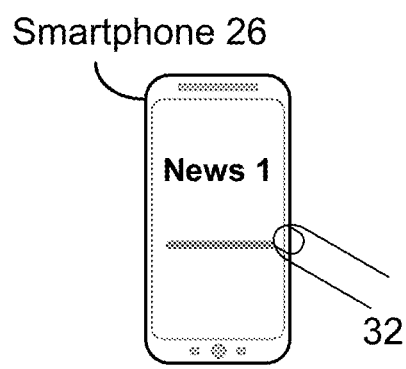
FIG. 2-B
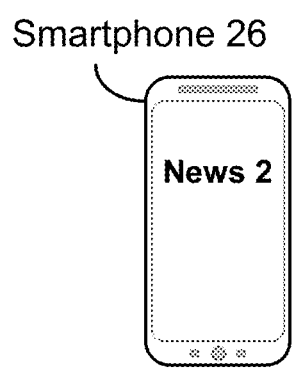
FIG. 2-C

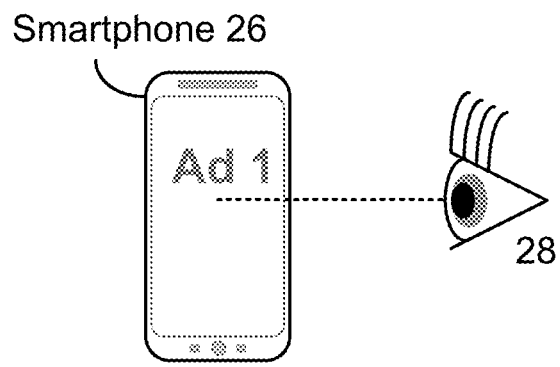
FIG. 3-A
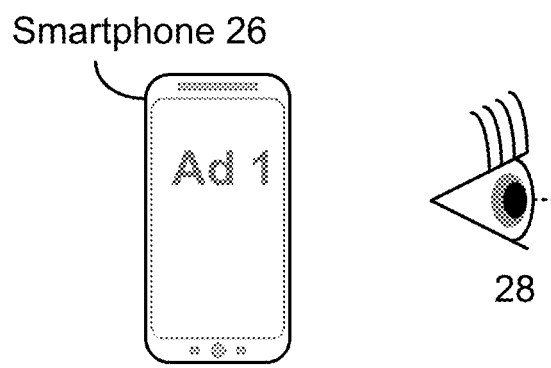
FIG. 3-B
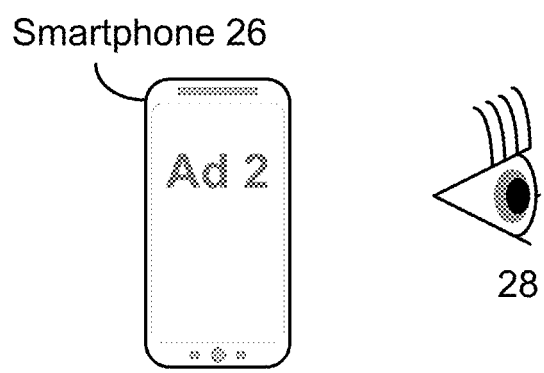
FIG. 3-C
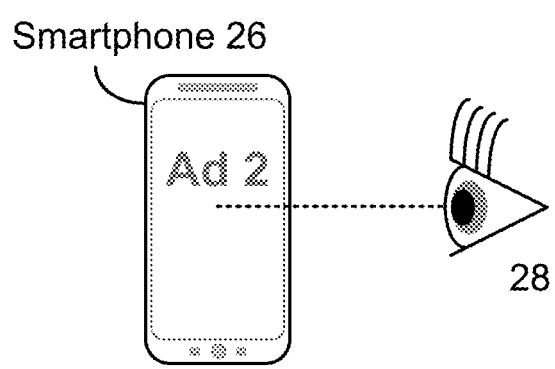
FIG. 3-D

SYSTEMS AND METHODS FOR OBTAINING AND UTILIZING USER REACTION AND FEEDBACK

CROSS REFERENCE TO RELATED APPLICATION

This application is entitled to the benefit of Provisional Patent Application Ser. No. 61/875,702, filed Sep. 10, 2013.

FEDERALLY SPONSORED RESEARCH

Not applicable

SEQUENCE LISTING OR PROGRAM

Not applicable

BACKGROUND

Field of Invention

This invention relates to obtaining and utilizing user reaction and feedback, more particularly to obtaining and utilizing user reaction and feedback on contents presented on an electronic device.

Description of Prior Art

With the ever-expanding Internet, and proliferation of electronic devices, such as computers and especially smartphones, getting information or contents becomes much easier and much more convenient than in the past. But the advance tends to be one-way traffic so far, with limited progress on obtaining reaction and feedback from the viewer or user side. User feedback information is highly desired by content makers and providers. In particular, it is an issue bothering advertisers. As advertisements are often subject to all kinds of thinking, advertisers are eager to know the opinion of users on their product. For instance, if an ad is unpopular, its effect would be severely compromised. So for contents presented on electronic devices, there exists a need to get reaction and feedback from viewers or users in the present digital age.

With the abundance of online information, users have more and more contents to watch or read, and thus become more selective. Consequently, the situation of sponsored content like advertisement, which often shows up by surprise, becomes more awkward. For instance, while users surf on the Internet and enjoy info they like to, online advertisements often play an interfering role, and may easily be labeled as intrusive, obtrusive, or interruptive, even though ads have been an indispensable part in the internet world. Indeed, advertisement is literally the supporting force behind many "free" online services and products. Without ad sponsorship, the Internet would be hardly "free".

When an ad is not welcome by a user, it would be waste of time for the user and a display showing it, let alone running the risk of annoying or irritating him or her further. Thus, it is desirable to change the course when user's discomfort or annoyance toward an ad is detected. For instance, when it is sensed that a user doesn't like an ad, continuing showing the ad would become meaningless and unpleasant. Furthermore, quickly replacing a disliked ad with another one benefits both advertisers and users. The same thing is true for content other than ad, that is, if a user doesn't like it, better withdraw it and present another one. Therefore, there exists a need to change content presented on a device when negative reaction or feedback is detected.

Because showing some content on a display doesn't mean the content is watched by a user, it is often unclear how many users actually watched it and how long a user spent time with it. Thus charging sponsor or advertiser for showing their paid program may pose a guessing task. For instance, a user may just look away when a display has a content show, or look at one display area while ignoring the rest area. Thus it is desirable for sponsors, advertisers and service providers alike to know content viewing record, and it is also fair and desirable to have a charging system based on viewing records. Therefore, there exists a need to obtain a user's viewing history and to charge sponsor or advertiser fees accordingly.

There are many online contents and shows which users like to watch, but there are others which a sponsor would like users to watch, such as advertisements. Because most people tend to shun away from ads, it is desirable to create incentive programs to entice and encourage people to spend time watching ads. Consequently, there exists a need to compensate users for viewing content with awards.

The term "content" or "contents" are broadly referred to any information, materials, or programs presented on electronic devices. Contents may include email, message, news, info, game, video, social network, or other types of presentation shown on a device. Content presentation may be paid or sponsored by a party or sponsor, such as commercials or other paid programs.

OBJECTS AND ADVANTAGES

Accordingly, several main objects and advantages of the present invention are:

a). to provide an improved method and system to obtain and utilize user reaction and feedback;

b). to provide such method and system which detect and collect reaction and feedback from users;

c). to provide such method and system which change presentation content in response to user reaction;

d). to provide such method and system which collect viewing history of users and charge a sponsor or advertiser accordingly;

e). to provide such method and system which award a user for watching certain programs utilizing the user's viewing record; and f). to provide such method and system which award users for providing feedback.

Further objects and advantages will become apparent from a consideration of the drawings and ensuing description.

SUMMARY

In accordance with the present invention, methods and systems are proposed to obtain and utilize reaction and feedback from users more effectively and more efficiently. Particularly, eye-tracking technology is used to detect user reaction, determine viewing history, and improve user experience. In one embodiment, when a user no longer gazes at certain content, indicating it may be unattractive or even disliked, the content may be withdrawn and other content may be arranged in time. In another embodiment, viewing records are used for analyzing user feedback, compensating users for viewing certain content, or charging sponsors or advertisers for presentation fees. In yet another embodiment, a user feedback mechanism other than gazing is described. Similar to user's viewing records, user feedback of other forms may be utilized to analyze user reaction to content, change content when needed, collect fees from sponsors, or award users for giving feedback.

DRAWING FIGURES

FIG. 1 is an exemplary block diagram describing one embodiment in accordance with the present invention.

FIGS. 2-A to 2-C and 3-A to 3-D are exemplary diagrams depicting two embodiments using user reaction and feedback in accordance with the present invention.

REFERENCE NUMERALS IN DRAWINGS

| 10 | Sensor | 12 | Database |
| 14 | Communication Network | 16 | Processor |
| 18 | Processing Module | 20 | Sensor |
| 22 | Computer Readable Medium | | |
| 24 | Sensor | 26 | Smartphone |
| 28 | Eye | 30 | Smartphone |
| 32 | Finger | 80 | Client System |
| 82 | Service Facility | | |

100, 102, 104, 106, 108, 110, 112, 114, 116, 118, 120, 122, 124, 126, 128, 130, 132, 134, 136, 138, 140, 142, 144, 146, 148, 150, 152, and 154 are exemplary steps.

DETAILED DESCRIPTION

Figure 1:
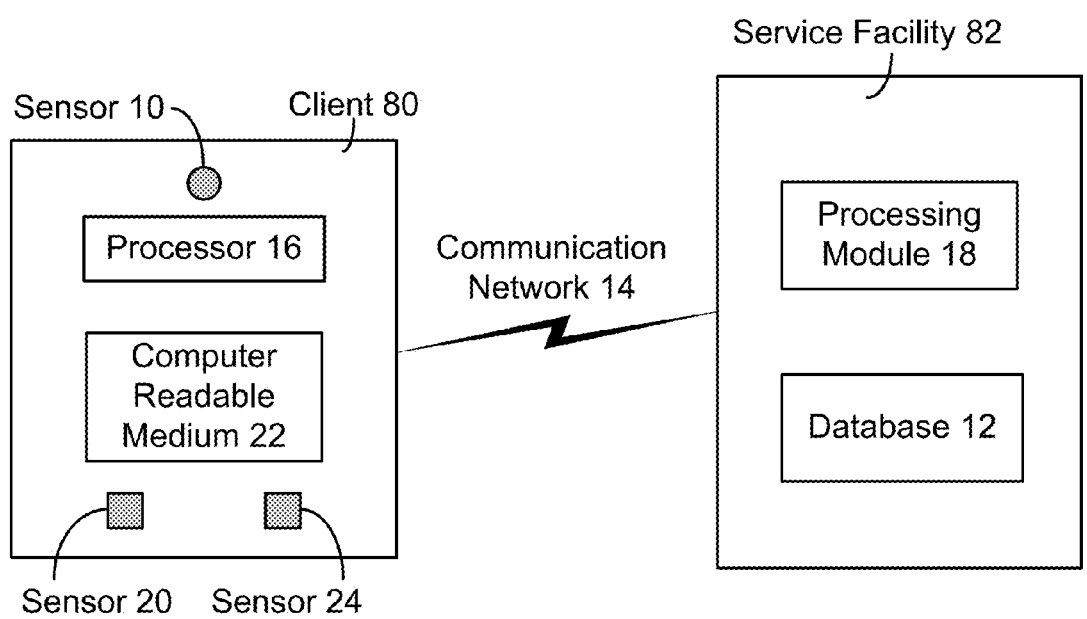

FIG. 1 is an exemplary block diagram of one embodiment according to the present invention. A client system 80 and service facility 82 are connected via a communication network 14. Client 80 may represent an electronic device, including but not limited to a smart phone, a desktop computer, a handheld computer, a tablet computer, other wireless gadgets (such as smart watch, mobile phone, media player, personal digital assistant (PDA), and the like), digital television (DTV), internet protocol television (IPTV), play station, etc. Client 80 may include a processor 16 and computer readable medium 22. Processor 16 may mean one or more processor chips or systems. Medium 22 may include a memory hierarchy built by one or more memory chips or storage modules like RAM, ROM, FLASH, magnetic, optical and/or thermal storage devices. Processor 16 may run programs or sets of executable instructions stored in medium 22 for performing various functions and tasks, e.g., surfing on the Internet, playing video or music, electronic payment, social networking, sending and receiving messages, executing other applications, etc. Client 80 may also include input, output, and communication components, which may be individual modules or integrated with processor 16. Usually, client 80 has a display with a graphical user interface (GUI). The display surface may be sensitive to touches, i.e., sensitive to haptic and/or tactile contact with a user, especially in the case of tablet computer, smart phone, or smart watch. A touch screen may be used to provide a convenient tool for a user to interact with a device. Client 80 may also have a voice recognition component to receive and recognize audio input from a user.

Service facility 82 may include a processing module 18 and database 12. Module 18 may contain one or more servers and storage devices to receive, send, store and process related data and information.

The word "server" means a system or systems which may have similar functions and capacities as one or more servers. Main components of a server may include one or more processors, which control and process data and information by executing software, logic, code, or carrying out any other suitable functions. A server, as a computing device, may include any hardware, firmware, software, or a combination. In the most compact form, a server may be built on a single processor chip. In the figure, module 18 may contain one or more server entities that collect, process, maintain, and/or manage information and documents, perform computing and communication functions, interact with users, deliver information requested by users, etc. Database 12 may be used to store the main information and data related to users and the facility. The database may include aforementioned memory chips and/or storage modules.

A communication network 14 may cover a range of entities such as the Internet or the World Wide Web, a local area network (LAN), a wide area network (WAN), a metropolitan area network (MAN), a telephone network, an intranet, wireless, and other types of networks. Client 80 and facility 82 may be connected to network 14 by various wired, wireless, optical, or other connections.

Client 80 may include a sensor 10 which tracks the eye of a user using mature eye-tracking technologies. The sensor may be arranged very close to the screen of a display and designed to obtain a picture of the facial part of a user. The system may recognize whether a user's gaze is in such a direction that the eye sight may fall on the display screen of client 80. In other words, sensor 10 may be employed to determine whether a user is looking at the screen of a device, or even a given part of a screen, through detection and analysis. For instance, sensor 10 may be built using imaging technologies, and the image of a user's eye may be analyzed to decide which direction the user is looking at by algorithm. Both visible and infrared light may be employed for eye-tracking. In the latter case, an infrared light source may be arranged to provide a probing beam.

Client 80 may also include a sensor 20 that functions as a motion detector, which is well known in the art and employed on some devices already. Sensor 20 may be used to detect the movement of an object outside of the device. It may include a camera-like system to obtain images and then recognize any movement through image analysis over a period of time. For instance, sensor 20 may be used for analyzing gestures of a user, which may be defined as an input. As sensor 10 has imaging taking capabilities, sensor 10 may be arranged to work both as an eye-tracking device and as a motion detector, which is desirable when small size is required.

Furthermore, client 80 may contain a sensor 24 to detect its own movement by sensing acceleration, deceleration, and rotation. Sensor 24 may employ one or multiple accelerometers, gyroscopes, and/or pressure sensors for performing various measurement tasks which may include detecting device shaking, device vibration, user running, user walking, and so on. When a device is not still or in irregular motion, sensor 24 may send a message so that client 80 may know the situation and suspend certain functions accordingly. For instance, when shaking happens and persists, user input via shaking action may be ignored or disabled.

FIGS. 2-A, 2-B, and 2-C exemplarily describe one embodiment which detects and utilizes a user's reaction and feedback. Assume that the device in use is a smartphone 26.

The phone, like most smart phones, has a touch-sensitive screen to receive a user's touch, tap, slide, glide, or scribble. It may also have an eye tracking component like sensor 10 of FIG. 1 to detect the gazing direction of a user. Furthermore, it may even detect whether a user watches contents located in one area of the screen. In FIG. 2-A, a user is reading contents of News-1 presented on the phone with eye 28. Smartphone 26 has sensed the user's gaze action. Maybe the user has read through the contents. So next in FIG. 2-B, the user may use his or her finger 32 to slide on the phone screen, which, by pre-arrangements, may mean the user wants to watch other contents. Thus in FIG. 2-C, in response to the user input, content News-2 replaces News-1 and hopefully the user would like to watch it. In the embodiment, both eye-tracking sensor and touch screen are used to receive user reaction and feedback. Eye tracking helps determine that a user watches target content, and thus user reaction and feedback become meaningful and may be taken into account. Replacing content is one way to answer user input and improve user experience. On the other hand, if a user spends no time watching contents, his or her input may not be taken by the system or used in user analysis.

Referring to FIGS. 3-A to 3-D, which schematically illustrate another embodiment of utilizing user reaction. Again, a smart phone is used for description of principles. In FIG. 3-A, the screen of smartphone 26 shows some content, e.g., advertisement Ad 1. A user may watch or gaze at the ad with eye 28. If for some reasons, the user is not interested in watching it any more, he or she may look away from the screen, as shown in FIG. 3-B. With eye-tracking technology, smartphone 26 may detect that the user no longer gazes at it. If a user doesn't like an ad, keeping it on the screen may not be helpful. Thus, the presentation of Ad 1 may stop and as in FIG. 3-C, Ad 2 may be arranged to show up on the screen. Hopefully, if the user is still available, his or her sight may return to the screen, and a watching period of Ad 2 may get started, as described in FIG. 3-D. So user reaction obtained by eye-tracking technology may be used to stop presenting certain content and switch to other content, which might win back a user. Moreover, stopping an ad show or changing ad may make advertisement less intrusive, less obtrusive, and more user-friendly. Contents presented may be transmitted to a device from a service center which may resemble service facility 82 of FIG. 1. Meanwhile, content viewing records of users may be transferred to the service center and stored at database like database 12 of facility 82.

Figure 4:
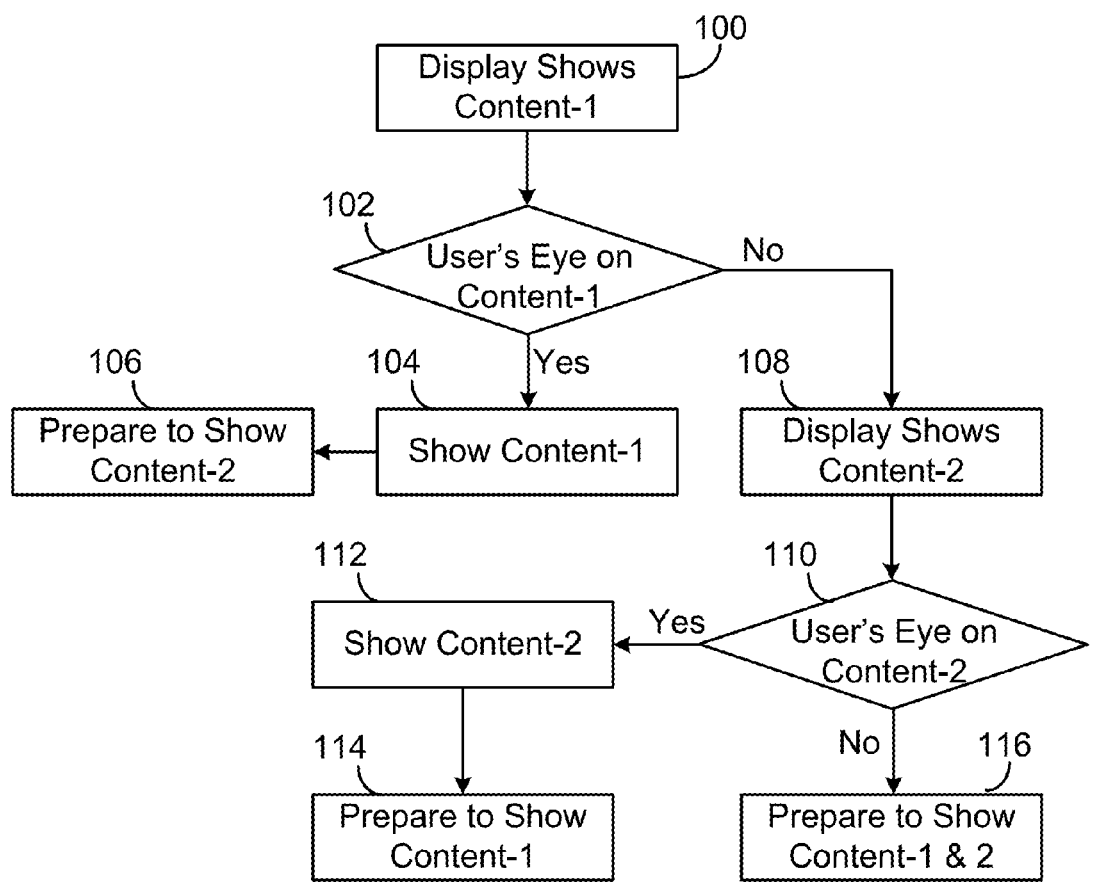
FIGS. 4 and 5 are exemplary flow diagrams showing respective embodiments in accordance with the present invention.

FIG. 4 shows a schematic flow diagram illustrating the embodiment previously disclosed in FIGS. 3-A to 3-D. In Step 100, a display is presenting Content-1. Next an eye tracking method is implemented to detect whether a user gazes at the content. If a display mainly shows Content-1, gazing at the display may mean watching the content. If a display shows Content-1 in a relatively small area of the display, gazing direction of adequate precision may be needed to determine the content is watched. Here assume gazing at the display is enough to acquire info of relevant content. An eye-tracking sensor may be in operational mode all the time. To conserve power, the sensor may also be turned on when certain content is being presented and turned off after the content show is over. With results of eye sensing, Step 102 leads to two situations. If a user keeps watching the content, Content-1 stays as in Step 104. Then in Step 106, Content-2 may be arranged and presented to the user next time. If the user turns sight away from the display for certain time in Step 102, Content-1 may be replaced by Content-2 in Step 108. In Step 110, the eye-tracking method is employed again to monitor whether the user looks at the display or content. If the user does get interested and eyes the display, Content-2 may run its course in Step 112. After that, the system may get prepared to bring back Content-1 in another try as in Step 114. But if the user doesn't gaze at Content-2 in Step 110 for a certain period of time, Step 116 kicks in, the display may stop showing Content-2, and the system may be ready for another attempt to introduce Content-1 and Content-2. It is noted that if a user repeatedly refuses some content for a given number of times, the content may be deemed unfit for the user and thus may not be introduced in the future.

Figure 5:
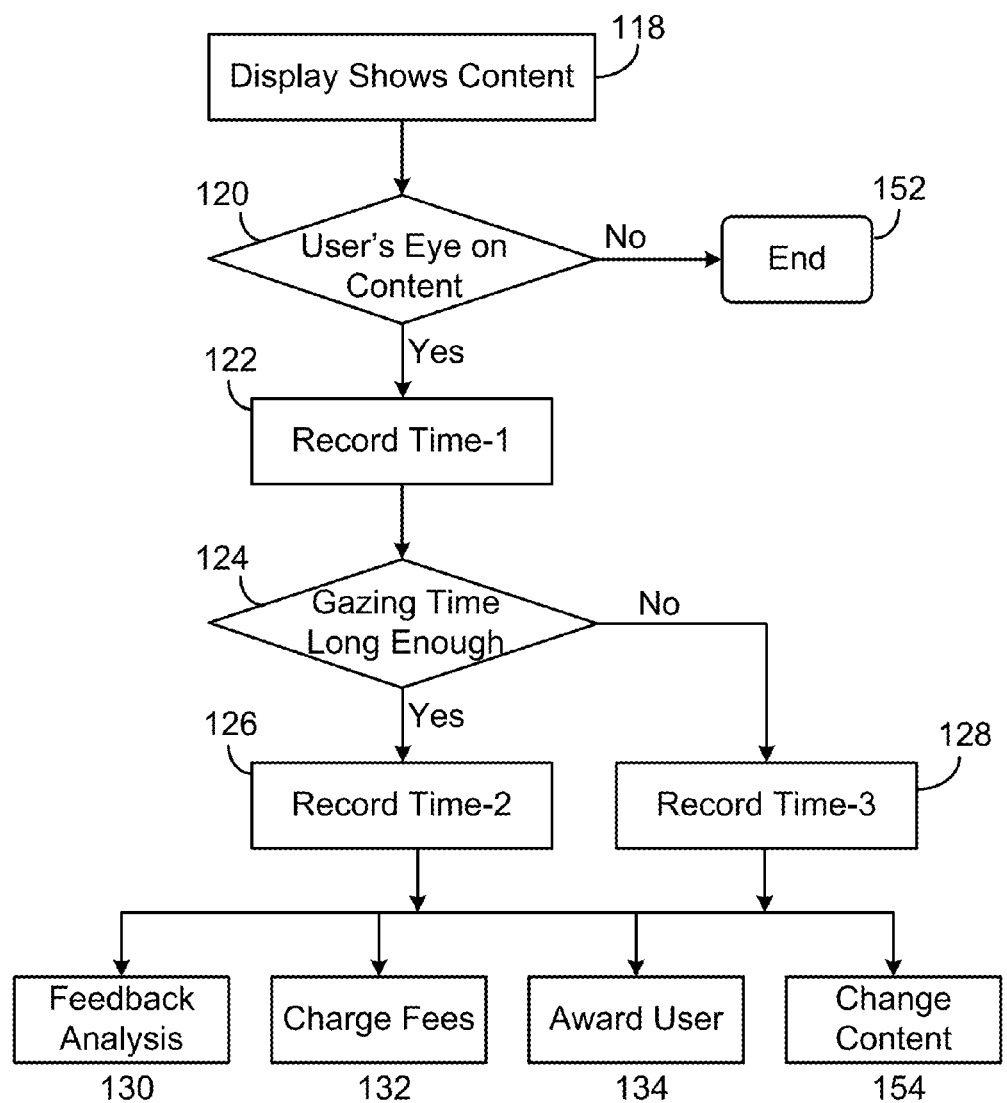

Eye tracking enables establishment of content viewing records, which may be taken as a user's reaction and feedback to the content presented. In addition, viewing records may be processed to analyze presentation effect, charge sponsor or advertiser, and award users. In FIG. 5, an exemplary flow diagram depicts an embodiment of such principles. It starts from Step 118, with certain content presented on a display. In Step 120, eyes of a user are detected to determine whether the user gazes at the content. Assume that watching the display is equal to watching contents on the display. If the user gazes at somewhere other than the display beyond a given period of time, the eye-tracking process may come to an end in Step 152, and the display may stop showing the content. If the user watches the content, time is recorded as Time-1 in Step 122. Next the movement of the user's eye is monitored in Step 124. If the user continues watching the display for certain period of time, another time Time-2 is recorded in Step 126, which may represent the last moment the user watches the display, or the end of a content show. If the user doesn't spend adequate amount of time watching the content, Time-3 is taken in Step 128 to record the time at which the user moves his or her eyes away from the display.

It is noted that Time-2 minus Time-1 may represent a long enough time period a user spends watching the content on the display, which may result in satisfactory comprehension. In contrary, Time-3 minus Time-1 means an inadequate time period a user spends with the content which may cause poor comprehension. The viewing time data, Time-1, Time-2, and Time-3, and the volume of content or the total time period of content show, may be transmitted to a service center like service facility 82 and aggregated with data of the same content from other users. The data may be put into use in the following steps.

Step 130 is focused on analyzing user feedback. Use regular averaging method to get the average viewing time, i.e., average time each user spends watching the content, which may represent a trend or collective reaction from users. A very short average viewing time may be interpreted as an unsuccessful presentation, either due to lack of interest, lack of connection, or both, or other reasons. A user's content viewing time may be compared to the average value to determine the relative interest level of the user. A user's viewing time of certain content may also be compared with his or her own average viewing time in the past, which may also reflect his or her attitude toward this content. Ratio of user's viewing time versus a video clip's full time may be used to detect the effectiveness of presentation as well. For instance, comparison between a ratio value obtained from a user's current viewing act and the average value among other users may reveal the effect of certain content on the user, so does the comparison between the ratio value and the average value of the user's own data.

In Step 132, viewing records may be used to charge content owner, sponsor, or provider. Take advertisements for example. In a conventional charging system, whether an ad is viewed by users and how long it is viewed are always unclear. With eye-tracking detection however, it may be possible to report precisely how much time a user watched an ad for. Then the advertiser may be billed by the time users actually spent watching the ad and/or the ratio of viewing time versus the ad's full time. It may be advantageous and fair to charge fees by the actual viewing time or the percentage a user finished when watching an episode of advertisement. As each user may watch ads differently, advertisers may be charged respectively based on the measurement data.

With a different focus, Step 134 works to benefit users. Some contents, like ads, are paid or sponsored programs. It may be reasonable for users to get paid besides service providers. As how much time a user spent on certain content is known, the user may be compensated accordingly, by service fee reduction, free minutes or free data for mobile device, or points for redemption of gift. A user may be awarded by watching sponsored content either fully or partially, making every effort worthwhile for users for the purpose of greater info exposure possible. Especially for advertisements, as discussed before, a pre-arranged awarding or compensation plan may be necessary to entice and encourage users to accept and watch ads. Eye-tracking techniques may enable such a method and make it beneficial for both users and advertisers.

In Step 154, user viewing time is used to determine whether contents should be changed based on a user's reaction and feedback. If it is detected that a user spent not enough time watching certain content, meaning the user may not like to watch it, it may be appropriate to switch the content to improve user experience and make presentation more effective. On the other hand, if a user has spent enough time watching one show, it may also be appropriate to stage another show so that a user would not become bored. This step is particularly applicable for advertisement presentation.

It is noted that data Time-2 and Time-3 may result in different actions. For instance, Step 130, 132, or 134 may not be carried out if Time-3 minus Time-1 is below a threshold value.

Figure 6:
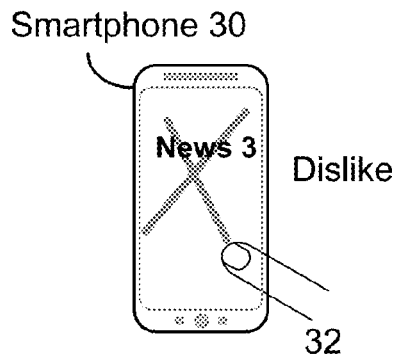
FIGS. 6 and 7 are exemplary diagrams describing embodiments to obtain and utilize user feedback in accordance with the present invention.
Figure 7:
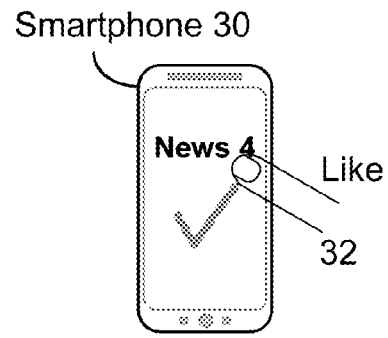

In FIGS. 6 and 7, schematic diagrams are prepared to describe an embodiment that emphasizes obtaining user feedback. Assume contents are of advertisement displayed on a smartphone 30. Since touch-sensitive screen has become a standard smartphone component nowadays, the embodiment utilizes it as an easy feedback tool for users. Referring to FIG. 6, Ad 3 is presented on smartphone 30 and a user doesn't like it. Assume that check mark and letter X represent the meaning of like and dislike respectively. A user may use finger 32 to scribble X in the ad area of screen to show his disproval or negative opinion on it. Once phone 30 senses that X is made in the Ad 3 area, it may respond according to pre-arrangements, like withdrawing the ad immediately, and then sending a message to service center to report the case. The negative input may also work as a trigger to replace Ad 3 by another ad. On the other hand, if a user likes Ad 4 in FIG. 7, he or she may sketch a check sigh on the screen to show a positive opinion. Again, the message may be sent to service center by the phone. Compared to eye-sight derived feedback, this method relies on more active user involvement, which may appeal to some users.

Figure 8:
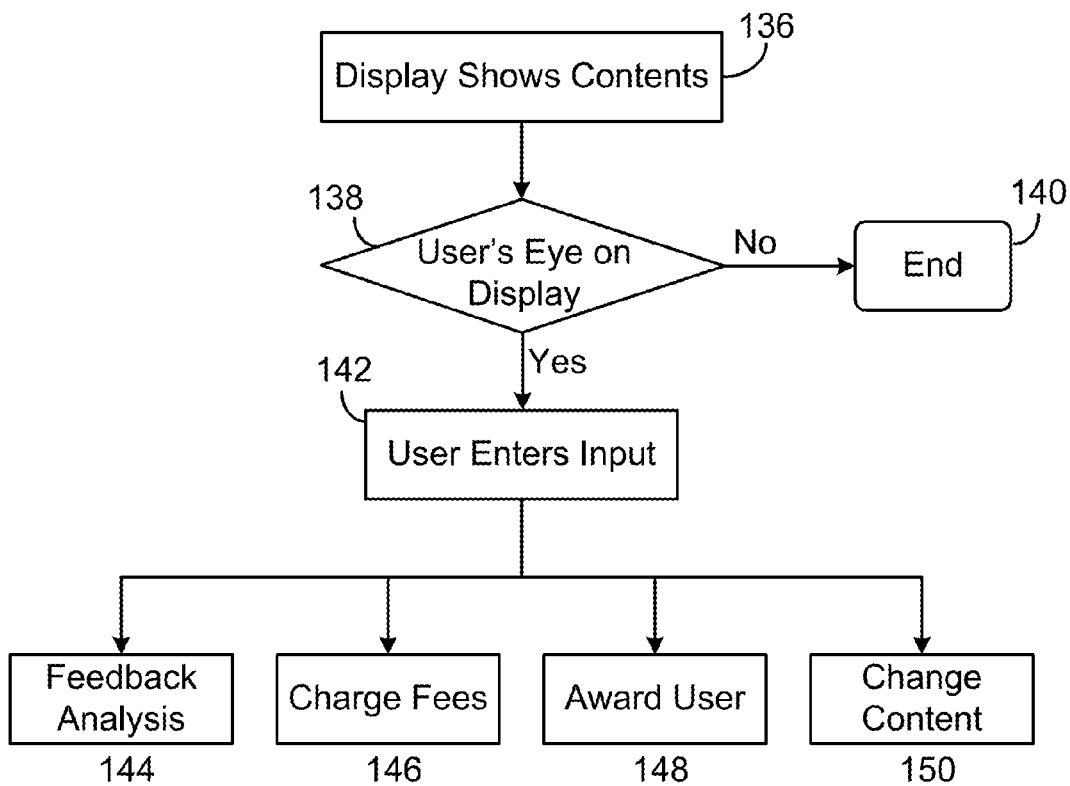
FIG. 8 is a schematic flow diagram showing one embodiment involving user reaction and feedback in accordance with the present invention.

FIG. 8 is an exemplary flow diagram which describes the usage of user input or feedback. In Step 136, contents are played on a display screen. With an eye-tracking sensor, a user's gaze direction is detected in Step 138. If a user doesn't watch the display for a predetermined period of time, the content show may stop and the process may end in Step 140. If it confirms that a user looks at the display for enough time in Step 138, which may mean adequate exposure of contents, the user may be considered qualified to give feedback if he or she likes to. Assume the user gives feedback on the content in Step 142. Again, take a smartphone for instance. For expression of like or dislike, a user may sketch a sign or symbol like X or check mark as that of FIGS. 6 and 7 on the phone's touch screen, or use many other functions provided and defined by the phone system, such as shaking the phone along certain directions, finger tapping with certain pattern or at certain location, hand or finger moving with certain rules, or verbal input like speaking "Good" or "No good" using voice recognition techniques. Other expressions such as "Don't care" may also be arranged with certain move or action. After an input is generated, the phone system may record the message along with time spent in watching the content. Again, data collected from users may be transmitted to a service center like service facility 82.

In Step 144, data from the user may be aggregated with data from other users for feedback on the same subject. The feedback data may also be compared with the user's own feedback records on the same or a similar category. For negative feedback, the comparison may reveal whether a user dislikes contents presented or is not interested in a certain subject in general. For instance, a "Like" feedback may just confirm that a user always like contents of certain topic. And if a user likes presentation of a subject most times, a "Dislike" response on contents of the same subject may indicate the user just doesn't like the way it is presented, which may be valuable information for content makers.

In Step 146, content owner, maker, or sponsor may be charged for receiving feedback from users, in addition to being charged by user viewing time. As feedback is useful and important for content improvement, paying to get it may be justified.

From a user's point of view, it's fair and reasonable to be awarded for providing feedback. Thus, in Step 148, users may get compensated for feedback act. Again a compensation scheme may include service fee reduction, certain free products, or points.

In Step 150, response to user feedback may be performed. For instance, if a user enters "Dislike" message, contents on display may be replaced by new ones promptly.

CONCLUSION, RAMIFICATIONS, AND SCOPE

Thus it can be seen that systems and methods are introduced to collect user reaction and feedback and to utilize user response.

The improved method and system have the following features and advantages:

(1). User reaction and feedback, including viewing records, are obtained using eye-tracking technology, touch-sensitive screen, and other methods;

(2). User reaction and feedback are utilized for user analysis, content appraisal, charging fees, awarding users, and replacing contents.

Although the description above contains many specificities, these should not be construed as limiting the scope of the invention but as merely providing illustrations of some of the presently preferred embodiments. Numerous modifications will be obvious to those skilled in the art.

Ramifications:

Sometimes a user is willing to pay for viewing certain programs, and the user may prefer paying for the actual viewing time, instead of a channel, a complete program, or even device presenting time, i.e., a time period in which a program is shown on the device. For instance, when a user only watched a program partially, the user may want to pay what is watched. Thus it is desirable to detect user viewing time by eye-tracking method and charge users based on the time measured. Take another example. A fee-based game may use eye-tracking data to charge users by actual viewing record, which means a user may not be charged even though a game is in progress on his or her device. It may provide convenience for users since a user doesn't need to exit a game or program when having to do something else.

For some smartphones, sensor 10, which performs eye tracking, may be a front facing camera. For other devices, the tracking function may be enabled by a head mounted device, like Google Glass, or other systems, assuming a user device and a tracking system are connected for data transfer.

Furthermore, a user device may be equipped with a facial recognition system. The system may recognize different users, such as senior and young members of a family, which makes feedback results more accurate and meaningful. The system may make use of a front facing camera to produce images of a user and employ facial sensing algorithm to identify him or her.

Lastly, when the eye of a user falls on things located outside of a display but close to its edge, instead of looking directly at the display, the user should not be considered as not eyeing the display. The reason is that, when a user looks at objects close to a display, contents shown on the display may also reach the eye, and thus it provides an opportunity anyway. So hopefully, the user may turn his or her sight a bit to get a better reception of the contents.

Therefore the scope of the invention should be determined by the appended claims and their legal equivalents, rather than by the examples given.

The invention claimed is:

1. A computer implemented method performed at a first device, comprising:
   1) getting info obtained at an electronic device, the electronic device operable to perform the following steps when executing certain instructions:
      a) presenting a plurality of contents via a display;
      b) sensing a user and determining whether the user looks at a direction toward the plurality of contents;
      c) measuring a watching time period during which the user looks at a direction toward the plurality of contents;
      d) transmitting measurement data obtained at the measuring step;
   2) receiving the measurement data;
   3) charging first fees to a corresponding entity for presentation of the plurality of contents, amount of the first fees related to the watching time period; and
   4) charging second fees to the user for a period of time during which the user watches certain program presented on the display.

2. The method according to claim 1 wherein the sensing step is triggered by the presenting step.

3. The method according to claim 1 wherein the plurality of contents is changed when the watching time period is smaller than a predetermined value.

4. The method according to claim 1, further including awarding the user based on the watching time period.

5. The method according to claim 1, further including awarding the user after given response from the user is received.

6. The method according to claim 1 wherein the plurality of contents is changed after predetermined response from the user is received.

7. The method according to claim 1, further including obtaining a gazing time period during which the user gazes at a direction toward the display and awarding the user or charging the corresponding entity accordingly.

8. A computer implemented method performed at a first device, comprising:
   1) getting measurement data obtained at an electronic device;
   2) the measurement data including a watching time period during which it is detected that a user looks at a direction toward a display of the electronic device, wherein a plurality of contents is presented on the display;
   3) charging first fees to a corresponding entity for presentation of the plurality of contents, amount of the first fees related to the watching time period; and
   4) charging second fees to the user for a period of time during which the user watches certain program presented on the display.

9. The method according to claim 8, further including awarding the user based on the watching time period.

10. The method according to claim 8 wherein the plurality of contents is changed when the watching time period is smaller than a predetermined value.

11. The method according to claim 8, further including changing the plurality of contents after predetermined response from the user is received.

12. The method according to claim 8, further including charging the corresponding entity for predetermined fees after predetermined feedback is received from the user.

13. The method according to claim 8, further including awarding the user based on predetermined feedback received from the user.

14. A system comprising: one or more processors; and one or more memory devices coupled to the one or more processors, the one or more processors operable when executing certain instructions to:
   1) get info obtained at an electronic device, the electronic device operable to perform following steps when executing certain instructions:
      a) presenting a plurality of contents via a display;
      b) sensing a user and determining whether the user looks at a direction toward the display;
      c) measuring a watching time period during which the user looks at a direction toward the display;
      d) transmitting measurement data obtained at the measuring step;
   2) receive the measurement data;
   3) charge first fees to a corresponding entity for presentation of the plurality of contents, amount of the first fees related to the watching time period; and
   4) charge second fees to the user for a period of time during which the user watches certain program presented on the display.

15. The system according to claim 14 wherein the plurality of contents is changed when predetermined response from the user is received.

16. The system according to claim 14 wherein the plurality of contents is changed when the watching time period is smaller than a predetermined value.

17. The system according to claim 14 wherein the user is awarded after the user makes predetermined response or gives certain feedback.

18. The system according to claim 14 wherein the user is awarded according to the watching time period.

19. The system according to claim 14 wherein the sensing step is triggered by the presenting step.

20. The system according to claim 14 wherein the corresponding entity is charged when predetermined feedback is received from the user.

* * * * *